United States Patent
Brüls et al.

[11] Patent Number: 6,122,314
[45] Date of Patent: *Sep. 19, 2000

[54] METHOD AND ARRANGEMENT FOR ENCODING A VIDEO SIGNAL

[75] Inventors: Wilhelmus H. A. Brüls; Richard P. Kleihorst; Albert Van Der Werf, all of Eindhoven, Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/795,493

[22] Filed: Feb. 5, 1997

[30] Foreign Application Priority Data

Feb. 19, 1996 [EP] European Pat. Off. .............. 96200418

[51] Int. Cl.⁷ ................................. H04B 1/66; H04N 7/12
[52] U.S. Cl. ...................... 375/240; 348/845.1; 348/608; 382/275
[58] Field of Search .................................. 348/845, 845.1, 348/618, 619, 416, 413, 620, 606–607, 608; 382/252, 260, 261–269, 274, 275; 375/240; 386/76

[56] References Cited

U.S. PATENT DOCUMENTS

| | | | |
|---|---|---|---|
| 4,682,251 | 7/1987 | Hirota et al. .......................... | 386/114 |
| 4,772,939 | 9/1988 | Fujiwara ................................ | 348/624 |
| 4,864,404 | 9/1989 | Matsuo .................................. | 348/613 |
| 5,005,081 | 4/1991 | Asano .................................... | 348/622 |
| 5,361,105 | 11/1994 | Iu ........................................... | 348/416 |
| 5,438,374 | 8/1995 | Yan ........................................ | 348/620 |
| 5,502,489 | 3/1996 | Kim et al. .............................. | 348/620 |
| 5,502,510 | 3/1996 | Kim et al. .............................. | 348/416 |
| 5,621,468 | 4/1997 | Kim ....................................... | 348/416 |
| 5,787,203 | 7/1998 | Lee et al. ............................... | 382/232 |
| 5,903,680 | 5/1999 | Haan et al. ............................ | 382/265 |

FOREIGN PATENT DOCUMENTS

| | | | |
|---|---|---|---|
| 0614312A2 | 9/1994 | European Pat. Off. ......... | H04N 5/21 |
| 6224773A | 8/1994 | Japan . | |

OTHER PUBLICATIONS

Boyce, "Noise Reduction of Image Sequences Using Adaptive Motion Compensated Frame Averaging", IEEE, pp. III–461 through III–464, Sep. 1992.

E. Dubois et al, "Noise Reduction in Image Sequences Using Motion–compensated Temporal Filtering", IEEE Transactions on Communication, vol. COM–32, No. 7, Jul. 1984, pp. 826–831.

Dubois, Eric Et Al (Jul., 1984). Noise Reduction in Image Sequences Using Motion–Compensated Temporal Filtering. IEEE Transactions on Communications, vol. Com.32, No. 7, pp. 826–831.

*Primary Examiner*—Vu Le
*Attorney, Agent, or Firm*—Laurie E. Gathman

[57] ABSTRACT

A system encodes an input video signal by subjecting the input video signal to noise reduction to obtain a noise-reduced signal, and encoding a difference between the noise-reduced signal and a prediction signal to produce an encoded signal. The system then decodes the encoded signal to obtain the prediction signal. In the system, the noise-reduction step comprises arithmetically combining the input video signal with the prediction signal.

12 Claims, 3 Drawing Sheets

METHOD AND ARRANGEMENT FOR ENCODING A VIDEO SIGNAL

FIELD OF THE INVENTION

The invention relates to a method of encoding a video signal, comprising the steps of subjecting said video signal to noise reduction to obtain a noise-reduced signal, encoding said noise-reduced signal, and decoding the encoded signal to obtain a prediction signal. The invention also relates to a video signal encoder carrying out such a method.

BACKGROUND OF THE INVENTION

A prior-art arrangement carrying out the method referred to in the opening paragraph is disclosed in European patent application EP-A 0 614 312. The arrangement comprises a cascade connection of a motion-compensated noise reduction circuit and an interframe encoding circuit. By subjecting the video signal to noise reduction prior to encoding, the coding efficiency is considerably improved. The noise reduction circuit of the known arrangement includes a plurality of frame memories and a motion estimator for estimating the amount of motion between successive input frames. The encoding circuit comprises a further frame memory and a further motion compensator to obtain a motion-compensated prediction image. It is the difference between the noise-reduced image and this motion-compensated prediction image which is eventually encoded.

In the prior-art video encoding system, a certain amount of synergy between the noise reduction circuit and the encoding circuit is achieved by applying motion vectors from the noise reduction circuit to the encoding circuit so as to aid in encoding the noise-reduced image.

OBJECT AND SUMMARY OF THE INVENTION

It is an object of the invention to provide a method and arrangement for encoding a video signal in a more cost-effective manner.

To this end, the method is characterized in that the step of noise-reduction comprises the step of arithmetically combining the video input signal with the prediction signal.

The invention is based on the recognition that the prediction signal, which is produced by an encoder for the purpose of interframe encoding, may be used for noise reduction as well. A special memory for noise reduction can thus be dispensed with and the noise reduction function is obtained without additional costs. A special advantage is that not only the noise in the input video signal is reduced. Noise reduction is also inherently applied to the quantization noise caused by the encoding process.

The step of predictively encoding may include motion estimation and compensation for obtaining a motion-compensated prediction signal. It is not only the coding efficiency which is improved but also the noise reduction has a considerably better performance. Moreover, the noise reduction function can effectively be embedded within an encoder performing in accordance with the MPEG standard.

In a further embodiment, the amount of noise reduction is controlled by a control signal indicating to what extent the prediction signal resembles the input signal. The more the prediction signal resembles the input signal, the more noise reduction is allowed and indeed effected. An embodiment including motion estimation and compensation is particularly attractive in this respect because said control signal is already available and does not need to be generated separately. Namely, the step of motion estimation already includes searching the motion-compensated prediction signal as a function of such a control signal. The mean absolute difference or the mean square error between the input signal and the (motion-compensated) prediction signal may constitute the control signal.

The step of noise reduction may comprise the step of combining a portion $\alpha$ of the input signal with a portion $(1-\alpha)$ of the (motion-compensated) prediction signal. Such an embodiment implements noise reduction by a first-order recursive temporal filtering process. It is to be noted that such a filter is known per se from E. Dubois et al.: "Noise Reduction in Image Sequences Using Motion-Compensated Temporal Filtering"; IEEE Transactions on Communications, Vol. COM-32, No.7, July 1984, pp.826–831.

DESCRIPTION OF PREFERRED EMBODIMENTS

Figure 1:
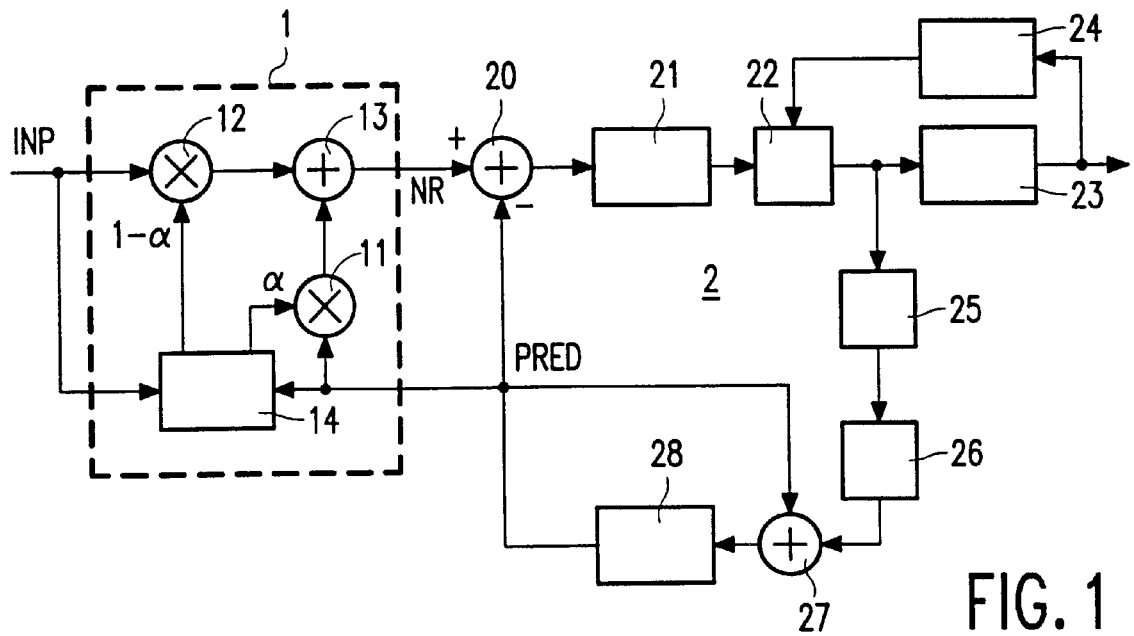
FIG. 1 shows a diagram of a video signal encoder carrying out the method according to the invention.

FIG. 1 shows a diagram of a video signal encoder carrying out the method according to the invention. The video signal encoder receives a digital video signal in the form of successive 8*8 pixel blocks. The blocks are applied to a noise reduction circuit 1 and then subjected to encoding by an encoding circuit 2.

Encoding circuit 2 comprises a subtracter 20 for obtaining the difference between the noise-reduced image from noise reduction circuit 1 and a prediction image PRED. The difference signal is then blockwise transformed into spectral coefficients by a discrete cosine transform circuit 21. The coefficients are quantized by a quantizer 22 and variable-length coded by a variable length coder 23. A bitrate control circuit 24 controls the stepsize of quantizer 22 for obtaining a desired bitrate. For generating the prediction image PRED, the encoding circuit further comprises an inverse quantizer 25, an inverse discrete cosine transform circuit 26, an adder 27, and a prediction frame or field memory 28, see the various circuit elements constituting encoding circuit 2 are well-known in the art.

As is shown in FIG. 1, the prediction image PRED is applied to the noise reduction circuit 1. In this circuit, the current input signal INP and the prediction signal PRED are linearly combined to constitute a noise-reduced signal NR in accordance with:

$$NR=\alpha\cdot PRED+(1-\alpha)\cdot INP \qquad \text{Eq. 1}$$

Since memory 28, which stores the prediction image, is included in a feedback loop of the video signal encoder, the noise reduction circuit is in fact a first-order recursive temporal filter. This is known to be an effective and attractive embodiment of noise reduction.

Figure 2:
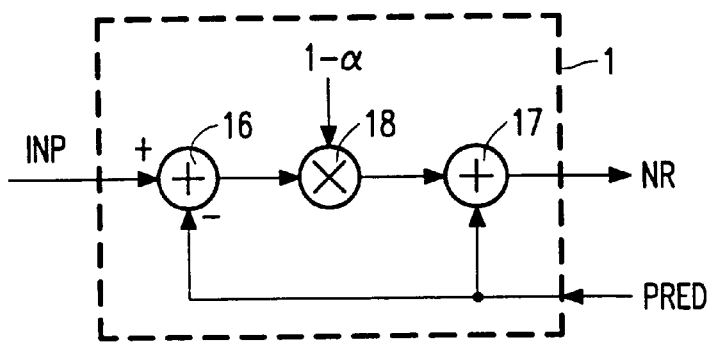
FIG. 2 shows a further embodiment of a noise reduction circuit which is shown in FIG. 1.

The noise reduction circuit 1 shown in FIG. 1 comprises a first multiplier 11 for weighting the pixels of the prediction signal block with a coefficient α, a second multiplier 12 for weighting the pixels of the input signal block with a coefficient 1−α, and an adder 13 for adding the weighted pixels together. This embodiment is a straightforward circuit implementation of Eq. 1. FIG. 2 shows an alternative embodiment using a single multiplier 18 and two adders 16,17. This embodiment calculates $$NR = PRED + (1-\alpha) \cdot (INP - PRED) \qquad \text{Eq. 2}$$

which is equivalent to Eq. 1.

In a very simple embodiment of the video signal encoder, the weighting coefficient α is a constant in the range 0<α<1. For example, using α=0.5 yields a noise reduction of 6 dB for stationary signals. Preferably, however, the weighting coefficient α is adaptively controlled in response to characteristics of the video signal. To this end, the noise reduction circuit 1 includes coefficient control means 14 adapted to calculate the mean absolute difference (MAD) between a sub-block S of pixels $I_{ij}$ of the input pixel block and a corresponding sub-block of pixels $P_{ij}$ of the prediction pixel block, MAD being defined as:

$$MAD = \sum_{i,j \in S} |I_{i,j} - P_{i,j}|,$$

or calculate the mean square error (MSE) between corresponding sub-blocks of current input signal and prediction signal, MSE being defined as:

$$MSE = \sum_{i,j \in S} (I_{i,j} - P_{i,j})^2,$$

and regulate the value of α in response thereto. Controlling the value of α for each sub-block (for example, 2*2 pixels) reduces the effect of noise on the control mechanism.

Figure 3:
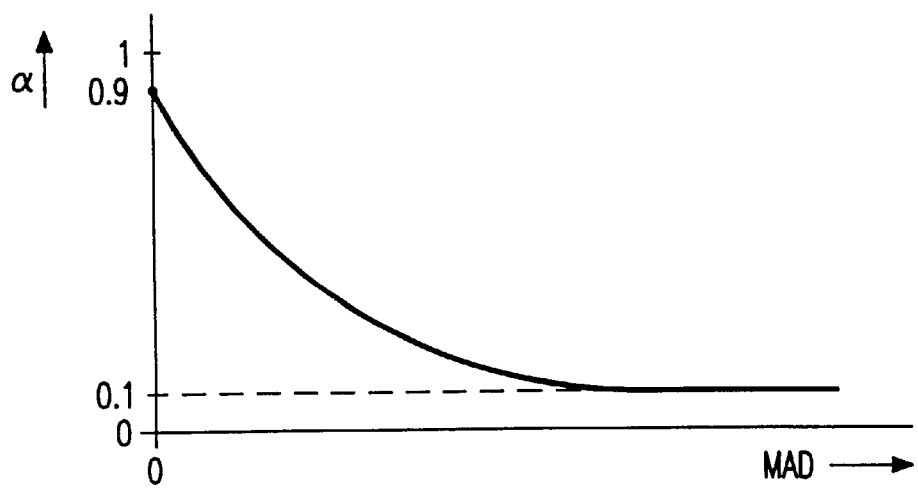
FIG. 3 shows a diagram illustrating the operation of a noise reduction coefficient control means which is shown in Fig. 1.

FIG. 3 shows a diagram illustrating an example of how weighting coefficient α may depend on MAD. For a small MAD, α has a predetermined large value and the amount of noise reduction is maximal. The amount of noise reduction decreases gradually for an increasing MAD. For a large MAD, α asymptotically approaches an appropriate small value and the noise reduction is minimal.

Figure 4:
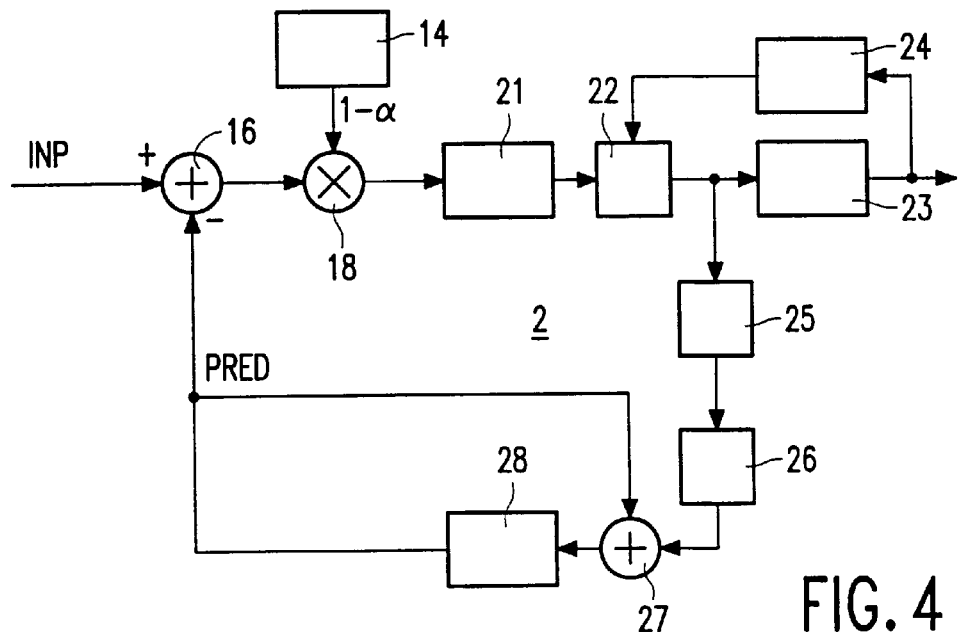
FIG. 4 shows an alternative embodiment of the video signal encoder.

FIG. 4 shows an interesting practical embodiment of the video encoder which is obtained when the mathematical operations of noise reduction circuit 1 and subtracter 20 (see FIG. 1) are combined. In accordance with Eq.2, the difference signal NR-PRED to be encoded can be written as:

$$NR-PRED = (1-\alpha) \cdot (INP-PRED)$$

Thus, the encoder shown in FIG. 4 comprises a subtracter 16 for subtracting the prediction signal from the input video signal, and a multiplier 18 for multiplying the difference signal with the coefficient (1−α) supplied by coefficient control means 14.

Figure 5:
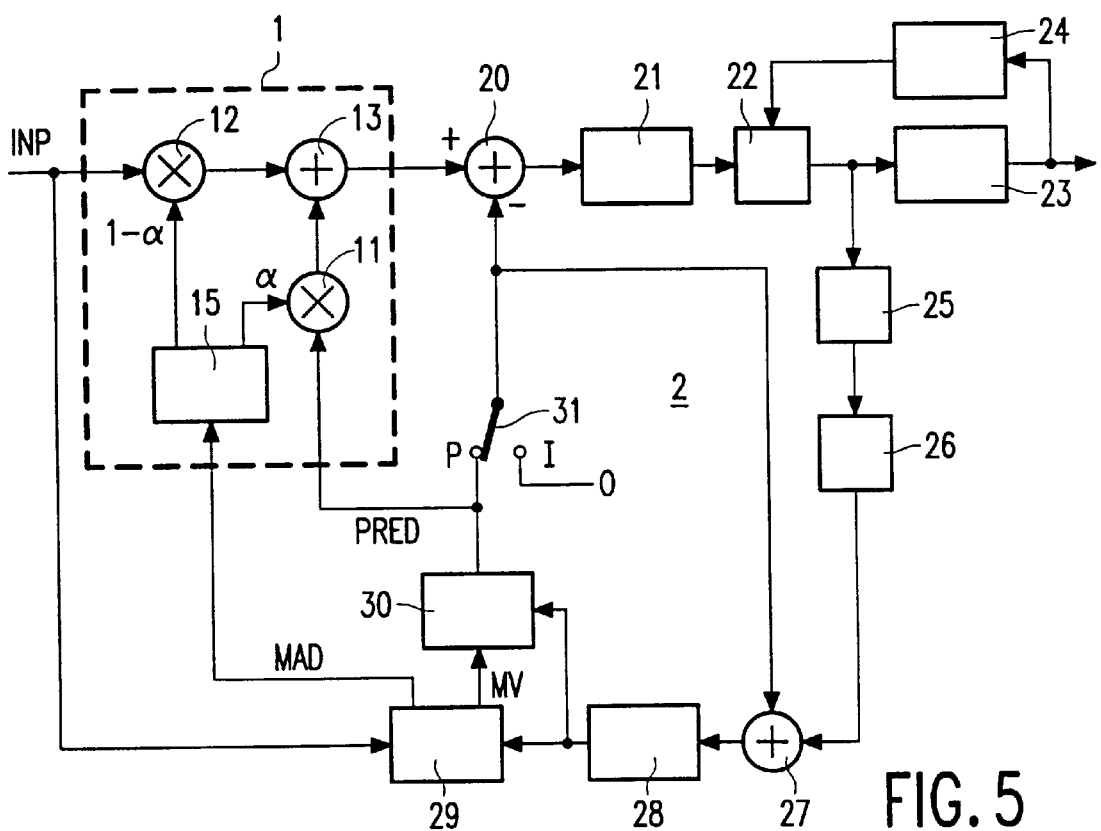
FIG. 5 shows a diagram of an MPEG video encoder with noise reduction according to the invention.

FIG. 5 shows a diagram of a further embodiment of the video signal encoder. This embodiment differs from the ones shown in FIGS. 1 and 4 in that the prediction image is now motion-compensated. It is not only the coding efficiency which is improved, but also the noise reduction has a considerably better performance. More particularly, the video signal encoder shown in FIG. 5 can easily be made to comply with the well-known MPEG standard. Selected images are now intraframe-encoded to obtain I-pictures, whereas other images are predictively encoded using motion compensation to obtain P or B-pictures. In the embodiment shown, a respective mode of operation is selected by a switch 31 having an intraframe (I) and a predictive (P) position. The predictive coding mode will be described first.

As is shown in FIG. 5, the prediction image stored in memory 28 and the current video input image are applied to a motion estimator 29. In a further known manner, the motion estimator searches, in memory 28, a block of pixels which most resembles the current input block of pixels. Various search algorithms are known in the art. They are generally based on evaluating the mean absolute difference (MAD) or the mean square error (MSE) between the pixels of the current input block and those of a candidate block. The candidate block having the least MAD or MSE is then selected to be the motion-compensated prediction block. Its relative location with respect to the location of the current input block is the motion vector MV which is transmitted along with the encoded video signal data. The motion vector MV is further applied to a motion compensator 30 which generates a motion-compensated prediction image. It is this motion-compensated prediction image PRED which is applied to noise reduction circuit 1 for the purpose of noise reduction, as explained before.

If the switch 31 is in the I-position, the motion-compensated prediction image is not applied to subtracter 20. However, the circuit elements 27–30 for generating the motion-compensated prediction image remain active for the purpose of noise reduction. Thus, noise reduction is applied to I-pictures as well and there are no observable noise reduction artifacts when switching from the predictive encoding mode to the intraframe encoding mode, and vice versa.

Again, the weighting coefficient α may be constant or adaptively controlled in response to characteristics of the encoded video signal. The latter option can now be obtained very cost-effectively because a signal indicating the extent of resemblance of prediction image and input image (for example, MAD or MSE) is already available within motion estimator 29 and does not need to be generated separately. In FIG. 5, the motion estimator is assumed to search the most resembling pixel block having the least MAD. The MAD associated with the selected pixel block is applied to coefficient control means 15 for conversion into an adequate weighting coefficient α as already discussed above with respect to FIG. 3.

Figure 6:
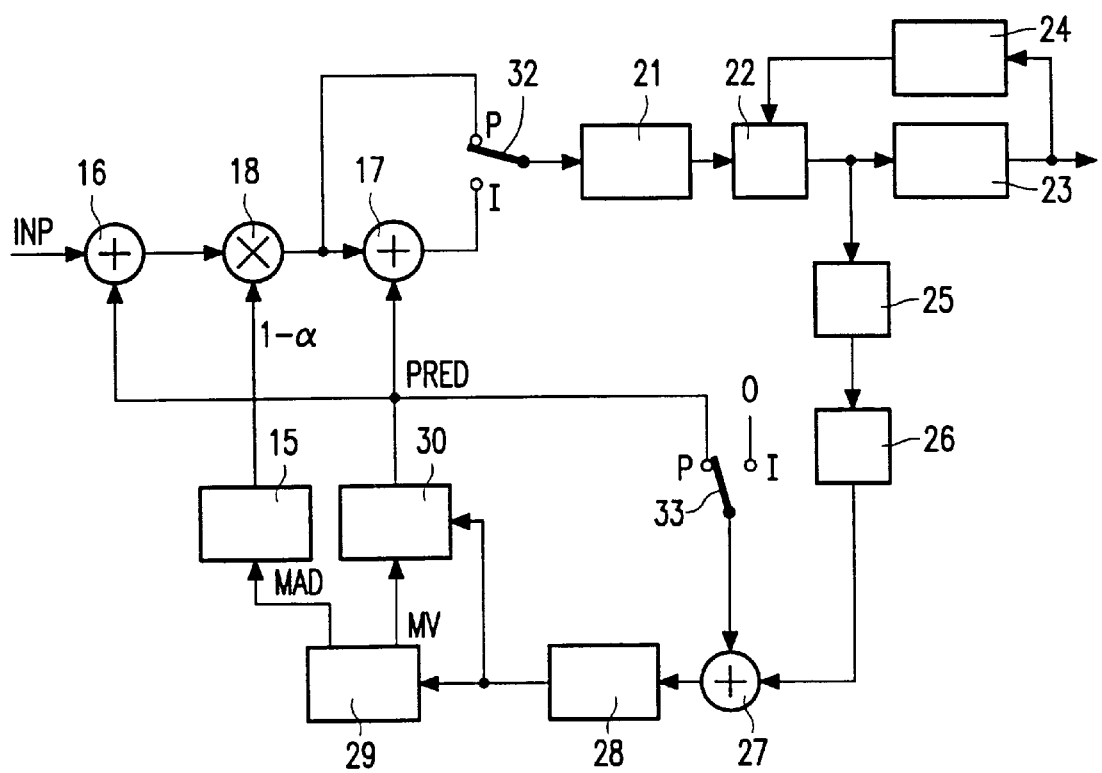
FIG. 6 shows an alternative embodiment of the MPEG video encoder with noise reduction.

FIG. 6 shows an alternative embodiment of the video encoder wherein the mathematical operations of noise reduction circuit 1 and subtracter 20 are combined. The noise reduction circuit now comprises a single multiplier 18 and two adders 16,17 (cf. FIG. 2). In the I-position of a switch 32, the output of adder 17 (i.e. the noise-reduced signal) is encoded. A further switch 33 prevents the prediction frame memory 28 from being updated in this operating mode. In the P-position of switch 32, the output of multiplier 18 (i.e. the noise-reduced signal minus the prediction signal) is encoded.

In summary, a video signal encoding method and arrangement is disclosed. The video encoder, for example, an MPEG encoder, produces a motion-compensated prediction image. Prior to encoding, said motion-compensated prediction image is combined with the input image which effectively causes both the noise in the input image and quantization noise to be reduced. The amount of noise reduction is preferably controlled in response to the same parameter as is used by the motion estimator to search for the most resembling pixel block in the prediction memory.

What is claimed is:

1. A method of encoding an input video signal, the method comprising the steps of:

subjecting said input video signal to noise reduction to obtain a noise-reduced signal;

encoding a difference between said noise-reduced signal and a prediction signal to produce an encoded signal; and decoding and decompressing the encoded signal to obtain the prediction signal;

wherein the step of subjecting said input video signal to noise reduction comprises arithmetically combining the input video signal with said prediction signal as feedback.

2. A method as claimed in claim 1, wherein the decoding step includes performing motion estimation and compensation to obtain a motion-compensated prediction signal.

3. A method as claimed in claim 2, wherein the motion estimation step includes searching the motion-compensated prediction signal as a function of a control signal indicating to what extent said motion-compensated prediction signal resembles the input video signal, and wherein an amount of noise reduction is controlled by said control signal.

4. A method as claimed in claim 1, wherein an amount of noise reduction is controlled by a control signal indicating to what extent said prediction signal resembles the input video signal.

5. A method as claimed in claim 3, wherein said control signal is a mean absolute difference or mean square error between pixels of the input video signal and said prediction signal.

6. A method as claimed in claim 1, wherein the noise reduction step comprises combining a portion of the input video signal determined in accordance with a weighting coefficient $\alpha$ with a portion $(1-\alpha)$ of the prediction signal.

7. An encoder as claimed in claim 1, wherein the noise reduction means combines a portion of pixels of the prediction signal determined in accordance with a weighting coefficient $\alpha$ with a portion $(1-\alpha)$ of pixels of the input video signal.

8. A video signal encoder for encoding an input video signal, the video signal encoder comprising:

noise reduction means for obtaining a noise-reduced signal based on the input video signal;

means for encoding a difference between said noise-reduced signal and a prediction signal to produce an encoded signal; and means for decoding and decompressing the encoded signal to obtain the prediction signal;

wherein the noise reduction means combines the input video signal with said prediction signal as feedback to the noise reduction means.

9. An encoder as claimed in claim 8, wherein the decoding means include a motion estimator and compensator for obtaining a motion-compensated prediction signal.

10. An encoder as claimed in claim 9, wherein the motion estimator searches the motion-compensated prediction signal as a function of a control signal indicating to what extent said motion-compensated prediction signal resembles the input video signal, and wherein an amount of noise reduction is controlled by said control signal.

11. An encoder as claimed in claim 8, further comprising means for controlling an amount of noise reduction in response to a control signal indicating to what extent the prediction signal resembles the input video signal.

12. An encoder as claimed in claim 11, wherein said control signal is a mean absolute difference or mean square error between pixels of the input video signal and said prediction signal.

* * * * *